US009405696B2

(12) United States Patent
Gaither et al.

(10) Patent No.: US 9,405,696 B2
(45) Date of Patent: Aug. 2, 2016

(54) CACHE AND METHOD FOR CACHE BYPASS FUNCTIONALITY

(71) Applicant: HEWLETT-PACKARD DEVELOPMENT COMPANY, L.P., Houston, TX (US)

(72) Inventors: Blaine D. Gaither, Fort Collins, CO (US); Patrick Knebel, Fort Collins, CO (US)

(73) Assignee: Hewlett Packard Enterprise Development LP, Houston, TX (US)

(*) Notice: Subject to any disclaimer, the term of this patent is extended or adjusted under 35 U.S.C. 154(b) by 0 days.

(21) Appl. No.: 14/165,947

(22) Filed: Jan. 28, 2014

(65) Prior Publication Data
US 2014/0143503 A1 May 22, 2014

Related U.S. Application Data

(62) Division of application No. 11/554,827, filed on Oct. 31, 2006, now Pat. No. 8,683,139.

(51) Int. Cl.
*G06F 12/08* (2016.01)

(52) U.S. Cl.
CPC ........ *G06F 12/0888* (2013.01); *G06F 12/0804* (2013.01); *G06F 12/0815* (2013.01); *G06F 12/0897* (2013.01)

(58) Field of Classification Search
CPC ............ G06F 12/0684; G06F 12/0802; G06F 12/0888
USPC ........... 711/133, 138, 139, 145, 118, E12.021
See application file for complete search history.

(56) References Cited

U.S. PATENT DOCUMENTS

| 4,075,686 A | | 2/1978 | Calle et al. |
| 4,189,770 A | | 2/1980 | Gannon et al. |
| 4,268,907 A | | 5/1981 | Porter et al. |
| 4,317,168 A | | 2/1982 | Messina et al. |
| 4,484,267 A | * | 11/1984 | Fletcher ........................ 711/124 |
| 4,646,233 A | | 2/1987 | Weatherford et al. |
| 4,851,993 A | | 7/1989 | Chen et al. |
| 4,888,679 A | | 12/1989 | Fossum et al. |
| 4,942,518 A | | 7/1990 | Weatherford et al. |
| 4,998,221 A | | 3/1991 | Correale, Jr. |
| 5,247,639 A | | 9/1993 | Yamahata |
| 5,265,232 A | | 11/1993 | Gannon et al. |
| 5,510,934 A | | 4/1996 | Brennan et al. |
| 5,515,521 A | * | 5/1996 | Whitted et al. .................... 711/3 |
| 5,526,500 A | | 6/1996 | Tanksalvala et al. |
| 5,625,793 A | | 4/1997 | Mirza |
| 5,704,058 A | * | 12/1997 | Derrick et al. ................ 711/168 |

(Continued)

FOREIGN PATENT DOCUMENTS

| JP | 5233450 A | 9/1993 |
| JP | 8137752 A | 5/1996 |

(Continued)

*Primary Examiner* — Michael Krofcheck
(74) *Attorney, Agent, or Firm* — Setter Roche LLP

(57) ABSTRACT

A cache is provided for operatively coupling a processor with a main memory. The cache includes a cache memory and a cache controller operatively coupled with the cache memory. The cache controller is configured to receive memory requests to be satisfied by the cache memory or the main memory. In addition, the cache controller is configured to process cache activity information to cause at least one of the memory requests to bypass the cache memory.

11 Claims, 5 Drawing Sheets

(56) References Cited

U.S. PATENT DOCUMENTS

| | | | |
|---|---|---|---|
| 5,708,784 A * | 1/1998 | Yanai et al. | 710/119 |
| 5,717,894 A | 2/1998 | Vivio | |
| 5,854,943 A | 12/1998 | McBride et al. | |
| 6,131,155 A | 10/2000 | Alexander et al. | |
| 6,161,208 A | 12/2000 | Dutton et al. | |
| 6,212,603 B1 | 4/2001 | McInerney et al. | |
| 6,347,360 B1 * | 2/2002 | Moudgal et al. | 711/133 |
| 6,356,980 B1 * | 3/2002 | Arimilli et al. | 711/138 |
| 6,370,618 B1 * | 4/2002 | Arimilli et al. | 711/122 |
| 6,434,673 B1 * | 8/2002 | Palanca et al. | 711/133 |
| 6,446,145 B1 * | 9/2002 | Har et al. | 711/154 |
| 6,496,902 B1 | 12/2002 | Faanes et al. | |
| 6,636,949 B2 | 10/2003 | Barroso et al. | |
| 6,662,273 B1 | 12/2003 | Wilkerson et al. | |
| 6,668,308 B2 | 12/2003 | Barroso et al. | |
| 6,751,705 B1 | 6/2004 | Solomon et al. | |
| 6,957,305 B2 | 10/2005 | Ray et al. | |
| 6,973,544 B2 | 12/2005 | Berg et al. | |
| 6,988,170 B2 | 1/2006 | Barroso et al. | |
| 7,017,011 B2 | 3/2006 | Lesmanne et al. | |
| 7,076,612 B2 | 7/2006 | Emons | |
| 7,107,410 B2 | 9/2006 | Yang | |
| 8,683,139 B2 | 3/2014 | Gaither et al. | |
| 2001/0032298 A1 | 10/2001 | Emons | |
| 2002/0046324 A1 | 4/2002 | Barroso et al. | |
| 2002/0087798 A1 * | 7/2002 | Perincherry et al. | 711/133 |
| 2002/0112132 A1 | 8/2002 | Lesmanne et al. | |
| 2002/0129208 A1 | 9/2002 | Barroso et al. | |
| 2003/0065886 A1 | 4/2003 | Olarig et al. | |
| 2003/0097531 A1 * | 5/2003 | Arimilli | G06F 12/0831 711/146 |
| 2003/0115402 A1 | 6/2003 | Dahlgren et al. | |
| 2003/0131200 A1 | 7/2003 | Berg et al. | |
| 2004/0044847 A1 | 3/2004 | Ray et al. | |
| 2004/0078790 A1 | 4/2004 | Wu et al. | |
| 2004/0088487 A1 | 5/2004 | Barroso et al. | |
| 2004/0268044 A1 | 12/2004 | Heller, Jr. et al. | |
| 2005/0021913 A1 | 1/2005 | Heller, Jr. | |
| 2005/0060126 A1 | 3/2005 | Coulson et al. | |
| 2005/0216672 A1 | 9/2005 | Gschwind et al. | |
| 2005/0216675 A1 | 9/2005 | Gschwind et al. | |
| 2006/0010292 A1 * | 1/2006 | DeVale et al. | 711/118 |
| 2006/0026355 A1 | 2/2006 | Okawa et al. | |
| 2006/0112233 A1 * | 5/2006 | Hu et al. | 711/138 |
| 2006/0179240 A1 | 8/2006 | Chatterjee et al. | |
| 2006/0224840 A1 | 10/2006 | Blumrich et al. | |
| 2008/0059707 A1 * | 3/2008 | Makineni et al. | 711/122 |
| 2008/0104329 A1 | 5/2008 | Gaither et al. | |

FOREIGN PATENT DOCUMENTS

| | | |
|---|---|---|
| JP | 2006048182 A | 2/2006 |
| JP | 2007505406 A | 3/2007 |
| WO | WO-2005026965 A1 | 3/2005 |

* cited by examiner

CACHE AND METHOD FOR CACHE BYPASS FUNCTIONALITY

CROSS REFERENCE TO RELATED APPLICATIONS

This application claims priority to, and is a divisional of, U.S. application Ser. No. 11/554,827, filed Oct. 31, 2006, titled "Cache And Method For Cache Bypass Functionality," which application is incorporated by reference herein as if reproduced in full below.

BACKGROUND

Computer systems often utilize a cache to improve computing performance and throughput by reducing the apparent time delay or latency normally associated with a processor accessing data in a main memory. Such a computer system may employ one or more caches, each including a cache memory in conjunction with control logic, such as a cache controller. Generally, each of the cache memories is smaller and faster than the main memory, so that a processor may access a copy of data from the cache memory more quickly and readily than from the main memory. To this end, computer systems often employ caches having memories that provide enough access bandwidth to handle the highest memory access rate (i.e. the "demand rate") of the system processors.

Typically, different types of processor workloads dictate different demand rates. If a cache is not designed to handle the maximum demand rate of its associated processor, many of the requests for access to the cache memory must be queued for some period of time. If the memory requests continue at a high rate, the length of the access queue increases, possibly to a level at which the resulting latency for some of the queued memory accesses is longer than the latency associated with a direct access to the main memory. As a result, for those periods of time, the cache actually lengthens memory access latency, thus becoming a performance hindrance within the computer system.

To prevent such a decrease in performance, caches typically are designed to handle the maximum demand rate, as described above, which often may involve complex cache designs and correspondingly expensive cache memories, due to the high access bandwidth they need to provide. Moreover, in some systems, various physical or design constraints, such as integrated circuit (IC) pinout, printed circuit board (PCB) layout, thermal characteristics, design complexity, time-to-market, and manufacturing costs, may prevent the system designer from implementing a cache providing the necessary bandwidth, thus leaving the designer with no option but to forego the implementation of a cache in the computer system altogether.

DETAILED DESCRIPTION

Figure 1:
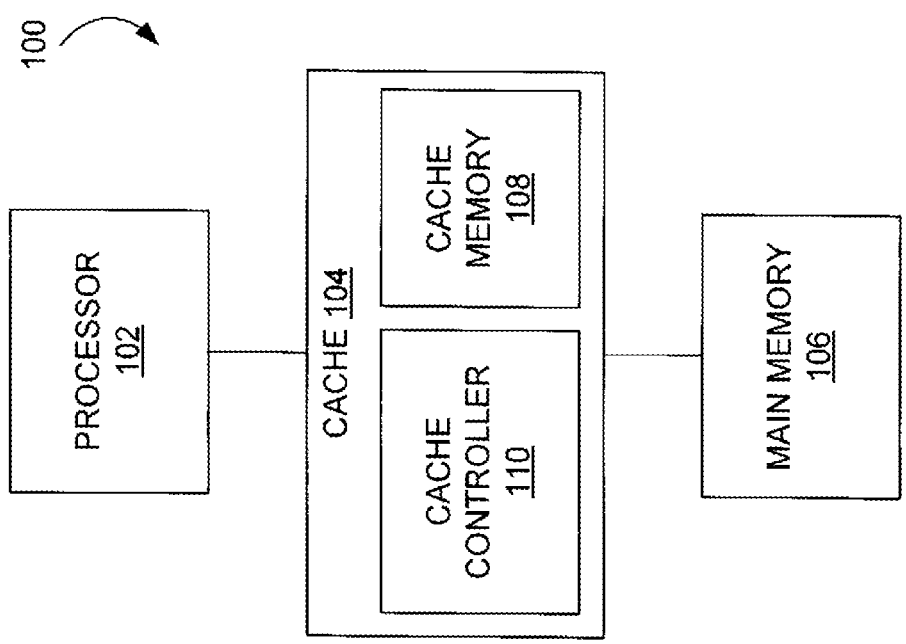
FIG. 1 is a block diagram of a computer system employing a cache according to an embodiment of the invention.

FIG. 1 illustrates one embodiment of the invention: a cache 104 employed within a computer system 100, wherein the cache couples a processor 102 with a main memory 106. The cache 104 includes a cache memory 108, as well as a cache controller 110 operatively coupled with the cache memory 108 and configured to receive memory requests, such as from the processor 102, to be satisfied by the cache memory 108 or the main memory 106. The cache controller 110 is also configured to process cache activity information to cause at least one of the memory requests to bypass the cache memory 108.

Figure 2:
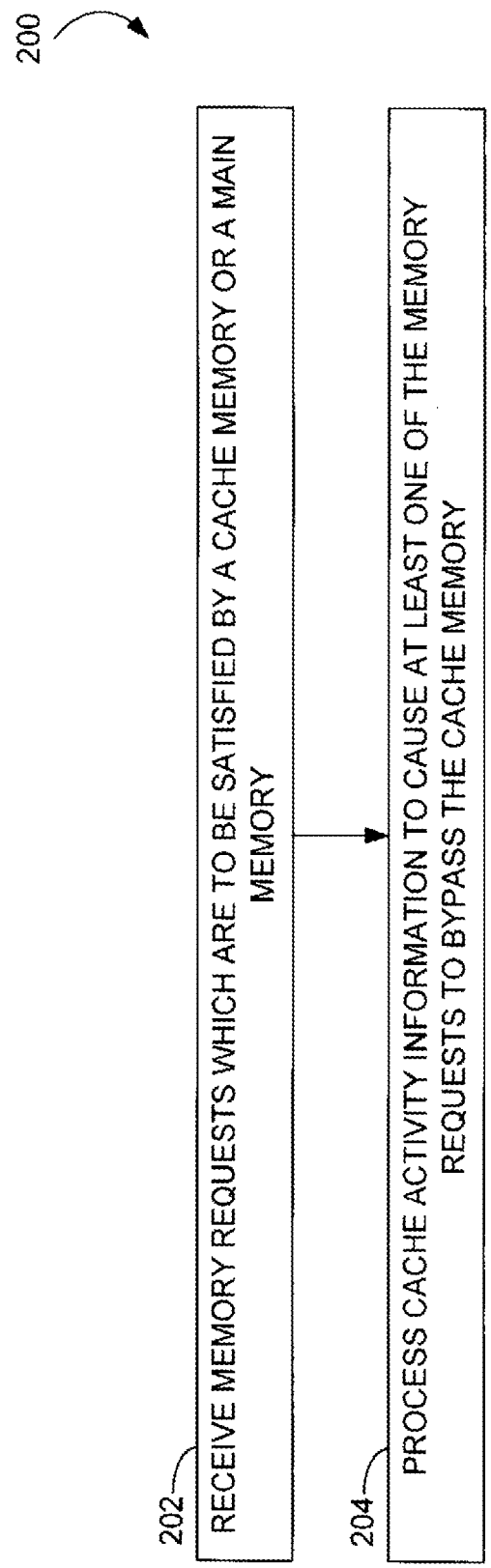
FIG. 2 is a flow diagram of a method according to an embodiment of the invention for operating a cache for operatively coupling a processor with a main memory.

Similarly, FIG. 2 provides a flow diagram of a method 200 of operating a cache, such as the cache 104 of FIG. 1. First, memory requests are received which are to be satisfied by a cache memory of the cache or a main memory (operation 202). Activity information of the cache is processed to cause at least one of the memory requests to bypass the cache memory (operation 204).

Figure 3:
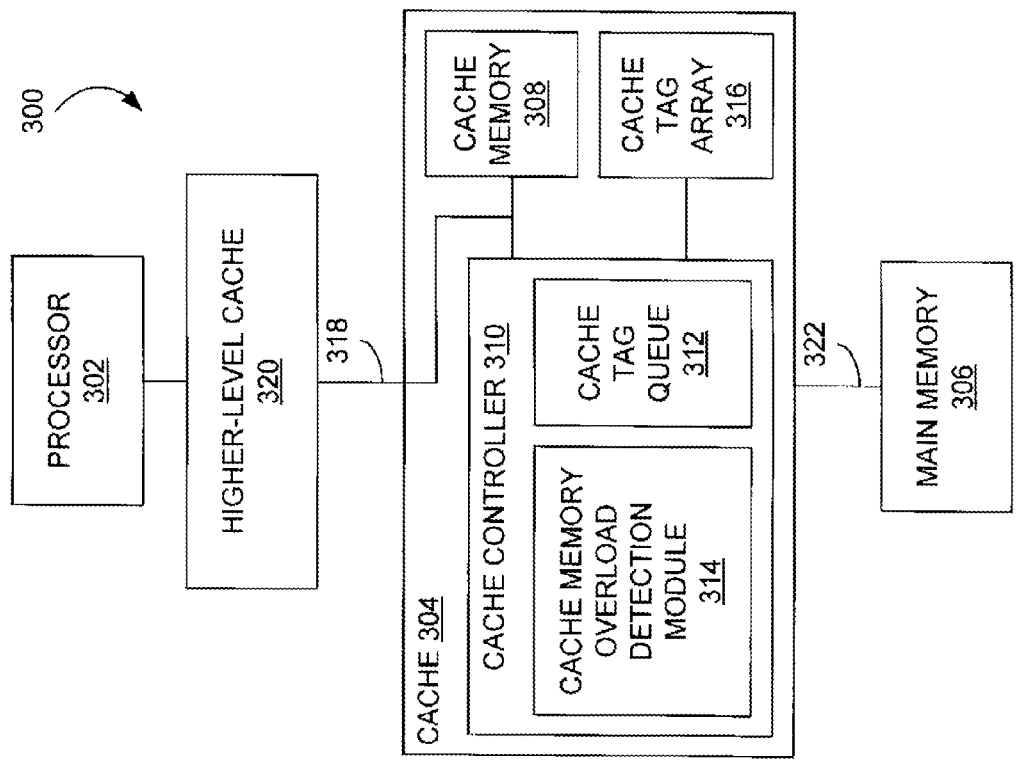
FIG. 3 is a block diagram of a computer system employing a cache according to another embodiment of the invention.

In FIG. 3 is presented a block diagram of another embodiment of the invention: a cache 304 employed within a computer system 300. The cache 304 operatively couples a processor 302 and a main memory 306. Optionally, at least one higher-level cache 320 may couple the processor 302 and the cache 304. One or more lower-level caches (not shown) coupling the cache 304 with the main memory 306 may be included in other embodiments. In another implementation, other caches residing at the same level as cache 304, either coupled with the processor 302 or another processor, may exist in the computer system 300.

The cache 304 includes a cache memory 308 configured to store copies of a portion of the data residing in the main memory 306. The cache memory 308 is typically organized as a group of cache lines, wherein each cache line is capable of storing a copy of a number of contiguous addressable locations in the main memory 306. Also provided in the cache 304 is a cache tag array 316 enabling random-access to cache line tags. Each tag is associated with a cache line in the cache memory 308, and indicates which locations of the main memory 306 are stored at that particular cache line.

The cache 304 also includes a cache controller 310, which controls several functions of the cache 304. For example, the cache controller 310 keeps track of the state of each cache line of the cache memory 308 by way of the cache tag array 316. For example, an invalid cache line is one that currently does not hold valid data. A valid unmodified cache line holds a copy of the data that matches the corresponding data in the main memory 306, while a valid modified cache line has been updated so that the data in the cache line no longer matches the corresponding data in the main memory 306. In that case, the data in the cache line should be written back to the main memory 306 before another cache or processor reads that data from the main memory 306.

The cache controller 310 also modifies the state of each cache line in the cache memory 308 based on access activity involving the cache memory 308 and other portions of the system 300. For example, if the cache controller 310 purges a valid modified cache line, thus writing back the cache line to the main memory 306 and making room in the cache memory 308 for another cache line, the cache controller 310 changes the status of that cache line from valid and modified to invalid. Typically, the cache controller 310 controls the state changes of the cache lines according to a predetermined cache coherency protocol, such as the Modified-Owned-Exclusive-Shared-Invalid (MOESI) protocol. Other cache coherency protocols involving these or other cache line states may be utilized in other embodiments. Use of a cache coherency protocol helps ensure that each copy of the same memory address of the main memory 306 holds the same value in the cache 304 and other caches of the computer system 300 so that the entire address space of the system 300 remains consistent throughout.

In FIG. 3, the cache controller 310 also includes a cache tag queue 312, which operates primarily as a First-In-First-Out (FIFO) queue of cache tags awaiting processing by the cache 304. More specifically, each access request from the processor 302 or the higher-level cache 320 for data in the cache memory 308 is associated with a cache tag. The cache controller 310 takes each cache tag in the queue and looks up the corresponding tag in the tag array 316. If a match is found, a valid copy of the requested data resides in the cache memory 308, and the request may be serviced using that cache line. Otherwise, the requested data typically must be accessed using the main memory 306.

In addition to processing memory read and write requests, the cache controller 310 may also "snoop," or monitor, activity on the buses to which it is attached, such as the bus 318 coupling the cache 304 with the processor 302 or the higher-level cache 320. A second bus 322 coupling the cache 304 with the main memory 306, to which other caches may be coupled, may be snooped in a similar manner. Snooping allows the cache controller 310 to detect other memory access activity with the computer system 300 that may affect the state of the cache lines in the cache memory 308. To this same end, the cache controller 310 may also send and receive broadcast messages with the various components of the computer system 300. In another implementation, the cache controller 310 may access a cache coherency directory (not shown in FIG. 3) shared among the caches of the system 300 so that the state of each cache line in the system 300 may be known to each cache by way of the directory.

The cache controller 310 also includes a cache memory overload detection module 314, which acts as a control module configured to detect or predict an overload condition of the cache memory 308. Based on the detection or prediction of such an overload, the control module 314 directs the cache controller 310 to cause one or more incoming memory requests to bypass the cache memory 308 and be directed to the main memory 306. The control module 314 may be incorporated within the cache controller 310, or be implemented as a separate circuit configured to be accessed by the cache controller 310.

In one implementation, the control module 314 detects or predicts an overload of the cache memory 308 by way of cache activity information, which may be any information indicating the amount or percentage of the maximum bandwidth provided by the cache memory 308 being consumed. For example, the control module 314 may monitor the portion of the bus 318 coupling the cache memory 318 with the processor 302 or the higher-level cache 320 to determine if any free bus cycles are available. If not, the utilization of the cache memory 308 may be at or near its maximum sustainable level. In another embodiment, the control module 314 may monitor the length of the cache tag queue 312 holding, for example, read operations from the processor 302 or data update operations from the processor 302 or the main memory 306, to determine whether the cache memory 308 is able to keep up with the memory requests being received by way of the queue 312. In one implementation, read operation requests and data update operation requests are held in separate cache tag queues 312, such as a data read queue and a data update queue. The higher the number of active requests waiting in the queue 312, the further the cache memory 308 is falling behind in servicing those requests, and the longer each one of the requests must wait before being serviced. The control module 314 may monitor other aspects or characteristics of the operation of the cache 304 to yield cache activity information in other embodiments.

Further, the cache activity information may be processed to generate one or more cache activity statistics, such as a maximum value or a running average of a monitored value. For example, one cache activity statistic may be a running average of the length of the cache tag queue 312, averaged over the last minute. Another could be a maximum value of the utilization of the bus 318 coupled with the cache memory 308 over the last thirty seconds. Many other types of statistics may also be generated. In another example, statistics of various cache activity information may be combined to yield an indication as to whether the cache memory 308 is, or soon will become, overloaded, thus delaying the servicing of one or more memory requests being received from the processor 302, the higher-level cache 320, or another component of the computer system 300.

Generally, once the cache activity information or statistics reach some predetermined level, the control module 314 may deduce that an overload condition of the cache memory 308 does or will exist, and that one or more incoming requests should bypass the cache memory 308 at that point. In one example, read requests bypassing the cache memory 308 may be routed directly to the main memory 306 so that the cache memory 308 does not service the request, even if the data is held therein. In another example, data update requests involving data being read from the main memory 306 that are not resident in the cache memory 308 may bypass the cache memory 308 so that the data is not stored in the cache memory 308. Further, data update requests which occur by way of data supplied by the processor 302 may bypass the cache memory 308 and be written directly to the main memory 306. Presuming that enough of the incoming requests bypass the cache memory 308, and the cache activity information or statistics indicate that the overload condition is alleviated, the control module 314 may indicate that future memory requests need not bypass the cache memory 308, thus returning the cache 304 to a more normal mode of operation. In one embodiment, the predetermined level employed to initiate bypassing the cache memory 308 may be the same level used to disable the bypassing mode. In another implementation, the level used to disable bypassing may represent a value lower than the predetermined level used to initiate bypassing. In that case, the use of two different statistical or informational levels for enabling and disabling the bypass mode may result in the control module 314 implementing a form of hysteresis to prevent unnecessary or unwarranted switching between the normal and bypass modes in the cache 304 in response to temporary surges or drops in cache memory 308 activity.

Figure 4:
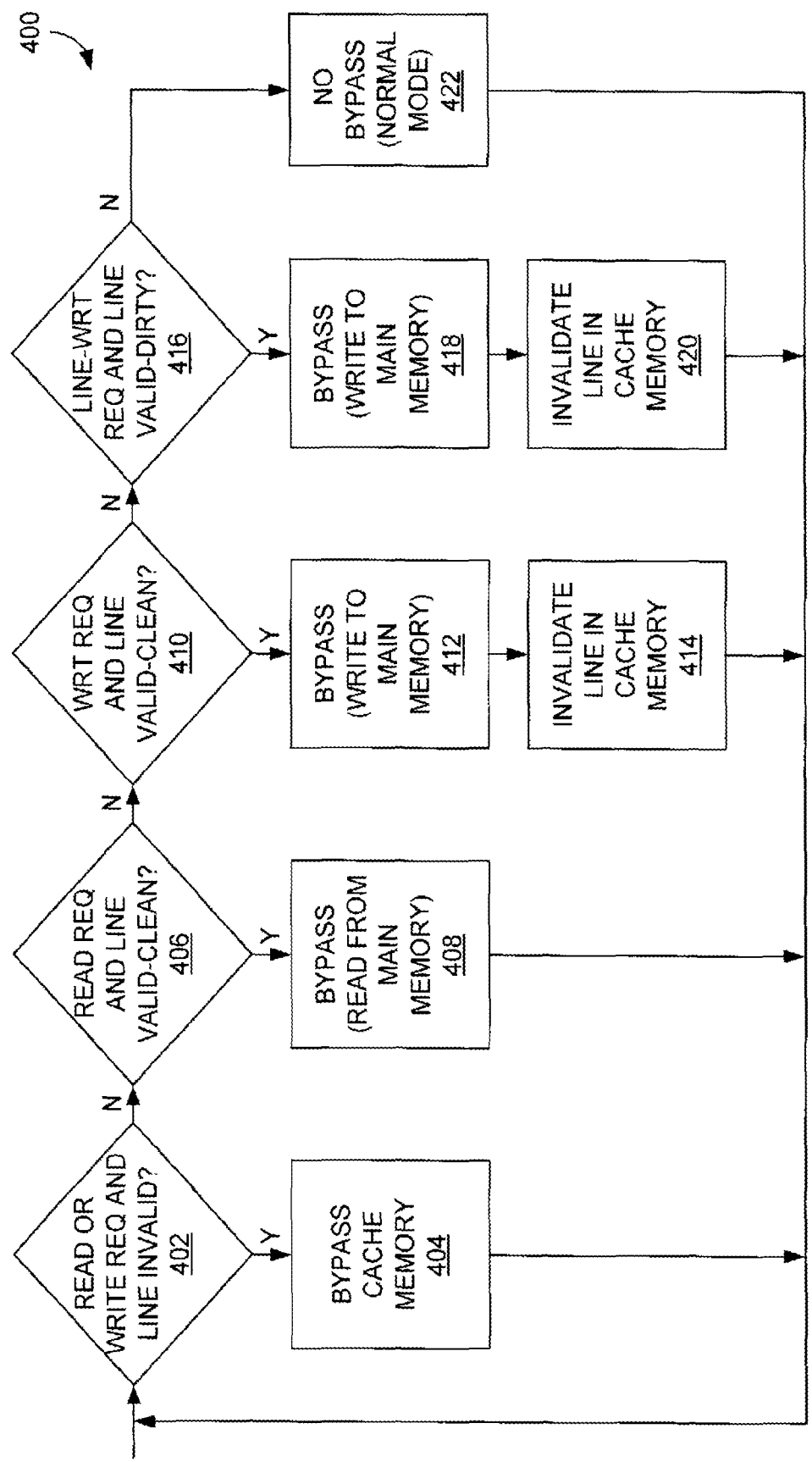
FIG. 4 presents a flow diagram of a method for determining whether a memory request is allowed to bypass the cache memory of the cache of FIG. 3 according to another embodiment of the invention.

To maintain cache coherency, some embodiments may take into account the current state of a cache line, which is often determined by way of a tag lookup in the cache tag array 316, to decide whether a memory request involving the cache line is allowed to bypass the cache memory 308. FIG. 4 illustrates a method 400 for making such a determination given the current state of the requested cache line. In one example, the cache controller 310 generally may allow any read or write request for a cache line that is not currently held in the cache memory 308 (operation 402) to bypass the cache memory 308 (operation 404). While the data involved in the request will not be available in the cache memory 308 to improve access latency for a later request, bypassing the cache memory 308 will reduce what otherwise may be an overload of the cache memory 308 bandwidth. In addition, since a copy of the data associated with the request will not be stored in the cache memory 308, no cache coherency problems arise with respect to that data.

A similar situation applies regarding a read or write request of a valid and unmodified, or "clean," cache line held in the cache memory 308. In the case of a read request (operation 406), the associated data may be read from the main memory 306 and passed directly to the requesting processor 302 or higher-level cache 320 while maintaining cache coherency (operation 408), since the data copies in the main memory 306 and the cache memory 308 agree. Similarly, for a write request involving a write of a valid and unmodified cache line (operation 410), the write request may bypass the cache memory 308 (operation 412). In addition, the cache controller 310 invalidates the corresponding cache line stored in the cache memory 308 (operation 414), as that data likely no longer matches the data just written to the main memory 306.

If a memory request involves a valid, but modified, or "dirty," cache line, only a write request involving a complete line-write (operation 416), in which all of the data within the cache line is to be written, may bypass the cache memory 308 (operation 418), thus writing the associated data directly to the main memory 306. In that case, the cache controller 310 also invalidates the cache line in the cache memory 308 by way of updating the cache tag associated with the affected cache line in the cache tag array 316 (operation 420). Otherwise, if the memory request is a read or a partial write of the dirty and valid cache line, bypassing the cache memory 308 is not available (operation 422). More specifically, if such a read request is allowed to bypass the cache memory 308, the data forwarded to the processor 302 or the higher-level cache 320 will not match the updated data line in the cache memory 308. If the partial-write request is allowed to bypass the cache memory 308 and is forwarded directly to the main memory 306, the cache controller 310 does not know whether all of the modified data of the corresponding cache line in the cache memory 308 have been overwritten in the main memory 306. As a result, the data in the main memory 306 within that cache line likely will not represent the true state of the data as understood by the processor 302 or the higher-level cache 320.

In some computer systems 300, cache-inclusiveness is employed to reduce the amount of communication among the cache 304, the higher-level cache 320, the processor 302 and other components of the computer system 300. Cache-inclusiveness typically requires that the valid contents of a higher-level cache, such as the higher-level cache 320 of FIG. 3, be replicated in the next lower-level cache, such as the cache 304. As a result, the amount of negotiation, and hence communication, between the cache levels is significantly reduced, thus releasing some available bandwidth over some of the system 300 buses, such as the bus 318 coupling the cache 304 with the higher-level cache 320, for other memory requests.

Figure 5:
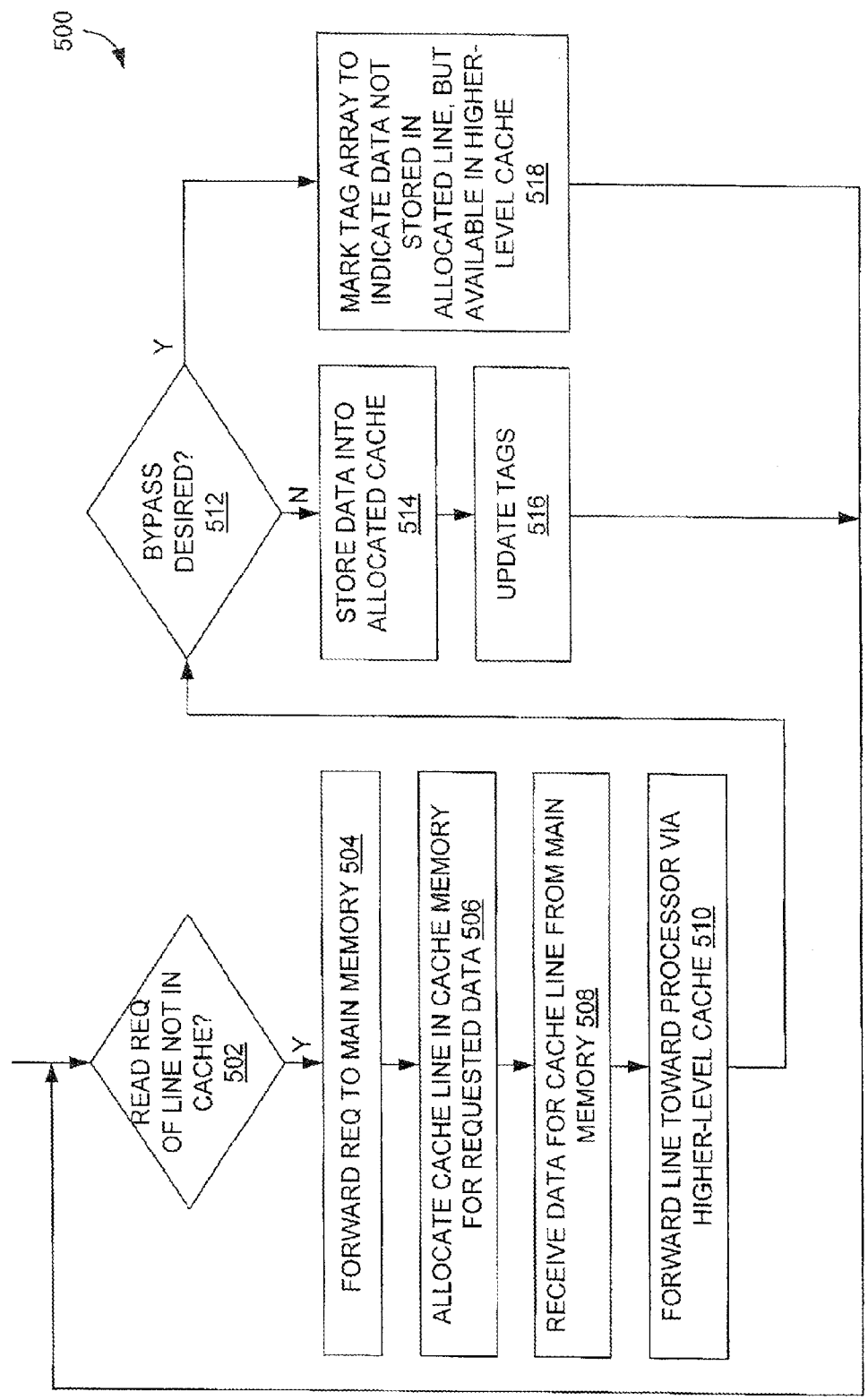
FIG. 5 presents a flow diagram of a method for maintaining cache-inclusiveness in the cache of FIG. 3 while providing bypass capability according to another embodiment of the invention.

The cache controller 310 of embodiments of the present invention may support cache-inclusiveness by indicating that one or more cache lines are allocated in the cache memory 308, but that the corresponding data in that cache line are not valid. FIG. 5 provides a method 500 for maintaining cache-inclusiveness while providing cache bypass capability. For example, if the higher-level cache 320 transfers a memory read request to the cache 304 for a cache line not held in the cache memory 308 (operation 502), the cache controller 310 will forward the request to the main memory 306 (operation 504) and allocate a cache line in the cache memory 308 (operation 506). Once the cache controller 310 receives the requested data corresponding to the cache line from the main memory 306 (operation 508), the cache controller 310 can forward the cache line toward the processor 302 by way of the higher-level cache 320 (operation 510). Also, the cache controller 310 may then determine whether the read request should bypass the cache memory 308 (operation 512). If not, the cache controller 310 may store the data returned from the main memory 306 into the allocated cache line of the cache memory 308 (operation 514) and update the appropriate tag in the cache tag array 316 accordingly (operation 516). Otherwise, the cache controller 310 may instead mark the cache tag array 316 for the allocated cache line to indicate that the data is not stored in the associated cache line in the cache memory 308, but instead is stored in the higher-level cache 320 (operation 518). By employing this method, the cache 304 still holds an indication of the all of the contents of the data stored in the higher-level cache 320, as required under cache-inclusiveness, while still bypassing the cache memory 308 to alleviate a predicted or detected overload of the cache memory 308.

In one embodiment, the cache controller 310 is configured to bypass memory requests which are associated with a particular memory request classification. For example, for a period of time during which the cache controller 310 predicts or detects an overload condition of the cache memory 308, the cache controller 310 may bypass the cache memory 308 with respect to memory requests for certain types of data, or from certain programs, as opposed to all memory requests available for bypass mode. Such functionality may be beneficial if, for example, the computer system 300 benefits more from caching certain types of data compared to others. Furthermore, directing only a portion of the memory requests directly to the main memory 306 may reduce the load on the cache memory 308 appreciably, thus allowing the cache 304 to service other memory requests normally in non-bypass mode.

Under this particular implementation, the memory requests may be classified in a number of ways, such as into requests for instructions and requests for data. Further, the data requests may be further classified into local data requests and remote data requests. Local data may be data stored within a portion of the main memory 306 located proximate to the processor 302 of a multiprocessor system, such as a symmetric multi-processor (SMP) system, while remote data may be stored in a portion of the main memory 306 identified with another processor. The memory requests may also be classified by way of the address of the requested data within the main memory 306, so that memory requests for data within a certain range are serviced by the cache memory 308, while others bypass the cache memory 308.

Various embodiments of the present invention, as described above, allow a cache to direct one or more memory requests to bypass the cache memory and route the request directly to main memory. In one embodiment, the cache controller associated with the cache employs this bypass mode when an overload of its corresponding cache memory is predicted or detected. In implementing bypass mode, the cache controller reduces the workload of the cache memory so that performance of the computer system does not decrease below a performance level associated with a system not implementing a cache. This functionality allows lower-cost, lower-performance caching systems employing slower cache memories to be incorporated in computer systems while still providing a significant enhancement to system performance. Moreover, cache systems may be integrated into systems whose design or physical constraints previously prevented the use of a cache. While slower cache memories may thus be utilized to significant advantage under the systems and methods discussed herein, caching functionality may be enhanced in one embodiment by ensuring that the cache controller and associated tag array are designed to be responsive under maximum system workload conditions to all memory requests, snoop demands, and other tasks involved in controlling the cache and maintaining cache coherency.

While several embodiments of the invention have been discussed herein, other embodiments encompassed by the scope of the invention are possible. For example, while some embodiments of the invention are described above in reference to the specific computer system architecture presented in FIG. 3, many other computer architectures, including multi-processor schemes, such as the SMP system mentioned above, may benefit from various aspects of the invention. For example, various characteristics of computer systems, such as the number of processors, the number of caches, the number of cache levels, and other parameters may be varied while implementing various embodiments of the invention. In addition, while the cache described herein is employed in a computer system, embodiments of the invention can be incorporated in a cache for any type of processing system, such as a special-purpose processing system, an embedded processing system, and the like. Also, aspects of one embodiment may be combined with those of alternative embodiments to create further implementations of the present invention. Thus, while the present invention has been described in the context of specific embodiments, such descriptions are provided for illustration and not limitation. Accordingly, the proper scope of the present invention is delimited only by the following claims.

What is claimed is:

1. A method comprising:
   determining an overload condition based on cache activity information that includes a running average length of a cache tag queue of the cache memory over a predetermined time interval; and
   causing at least one memory request to bypass the cache memory in response to determining that running average length of the cache tag queue has reached a predetermined level as an indicator of the overload condition, where the at least one memory request is for accessing the cache memory.

2. The method of claim 1, where a bus is coupled to the cache tag queue that holds the at least one memory request and where the at least one memory request is at least one of a request to read data in the cache memory or a request to update data in the cache memory.

3. The method of claim 1, where at least one bypassed memory request is associated with a memory request classification.

4. The method of claim 3, where the memory request classification comprises instruction requests and data requests.

5. The method of claim 4, where the classification of data requests comprises local data requests and remote data requests.

6. The method of claim 1, further comprising deeming the cache memory to be at a maximum sustainable level of utilization based on a free bus cycle not being available.

7. The method of claim 1, further comprising determining the overload condition of the cache memory further based on the cache memory not including at least one free bus cycle.

8. A method, comprising:
   generating a cache memory activity statistic related to a cache memory based on cache activity information that includes a running average length of a cache tag queue of the cache memory over a predetermined time interval;
   comparing the running average length of a cache tag queue with a predetermined level;
   determining that an overload condition of the cache memory is met based, at least in part, on a result of the comparison with the predetermined level; and
   upon determining that the overload condition is met, causing at least one memory request to bypass the cache memory.

9. The method of claim 8, wherein the cache memory statistic is further based on a value of maximum utilization of a bus coupled to the cache memory over a predetermined time interval.

10. The method of claim 8, further comprising:
    determining, based on the cache memory activity statistic, that the overload condition is alleviated by causing the at least one memory request to bypass the cache memory; and
    directing future memory requests to the cache responsive to the determining indicating that the overload condition is alleviated.

11. The method of claim 10, further comprising comparing the cache memory activity statistic to a bypass disable level as part of determining that the overload is alleviated, wherein the bypass disable level is lower than the predetermined level.

* * * * *